Feb. 1, 1944.     A. P. PEREZ     2,340,766
TRAVELING BASKET
Filed April 19, 1943     2 Sheets-Sheet 1
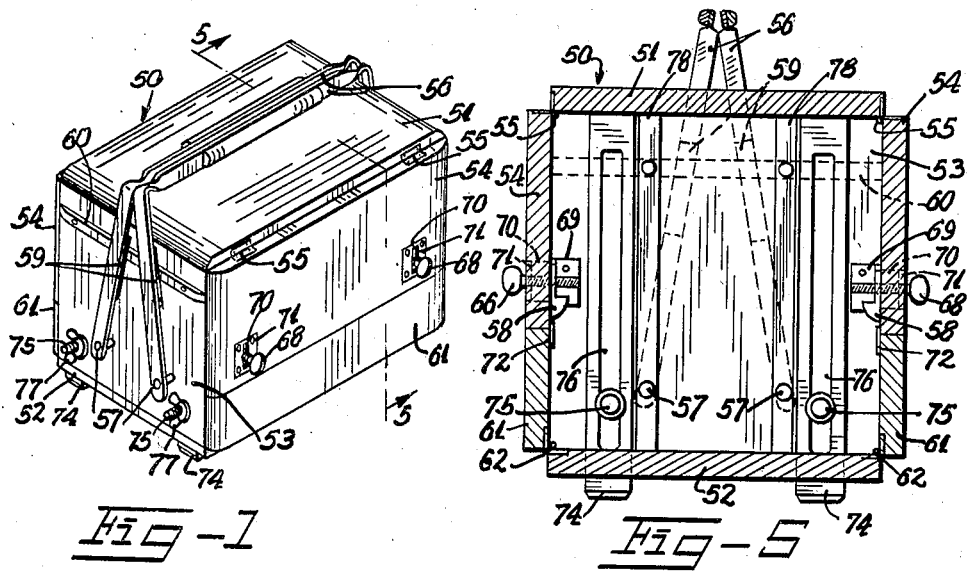
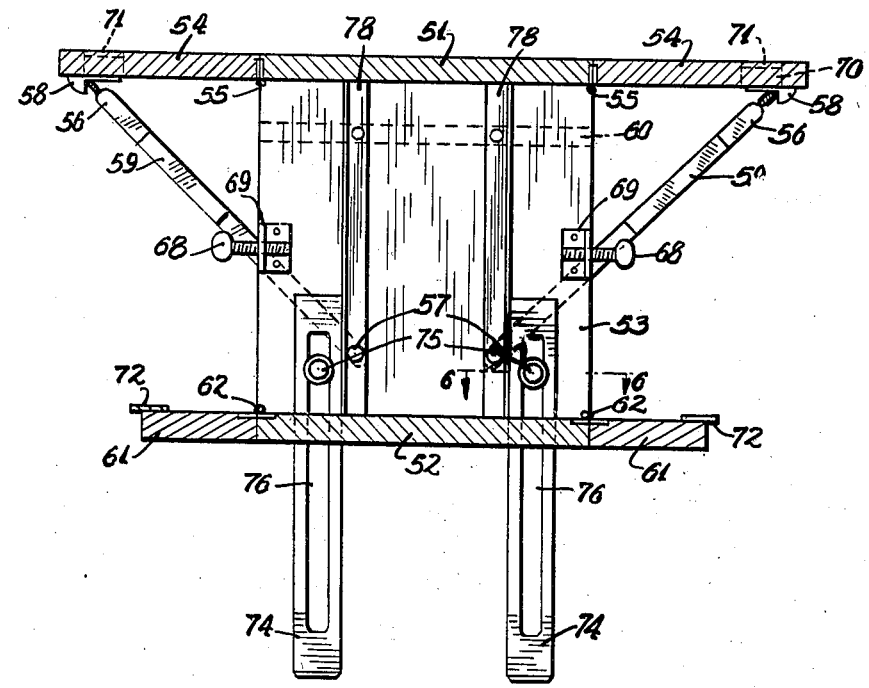
INVENTOR.
Antonio P. Perez
BY
ATTORNEY Feb. 1, 1944.    A. P. PEREZ    2,340,766
TRAVELING BASKET
Filed April 19, 1943    2 Sheets-Sheet 2

INVENTOR.
Antonio P. Perez
BY
ATTORNEY

Patented Feb. 1, 1944

2,340,766

UNITED STATES PATENT OFFICE 2,340,766

TRAVELING BASKET

Antonio P. Perez, Pawtucket, R. I.

Application April 19, 1943, Serial No. 483,673

3 Claims. (Cl. 190—12)

This invention relates to new and useful improvements in a traveling basket.

More specifically, the invention proposes the construction of a traveling basket characterized by a box-like container in which the food and other articles required for a picnic are adapted to be carried and which is arranged in a manner to be quickly and easily transformed into a table from which the food may be eaten.

Another object of the invention proposes to characterize the box-like container by an open front and an open back which are adapted to be closed by leaves pivotally mounted on the top wall of the container and which are extendable to project horizontally from the top wall to increase the overall size of the top wall.

Still further it is proposed to provide the container with handles adapted to be used for carrying the container and which are engageable beneath the leaves when extended from the top wall of the container in a manner to retain the leaves in their horizontal positions.

A still further object of the invention proposes providing the container with legs extendable from the bottom thereof in a manner to support the container in an elevated position in which its top wall will be substantially at table height.

It is a still further object of this invention to construct a traveling basket which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a traveling basket constructed in accordance with this invention and shown in its closed position.

Fig. 3 is a vertical sectional view on the line 3—3 of Fig. 2.

Fig. 5 is a sectional view taken on the line 5—5 of Fig. 1.

Figure 6:
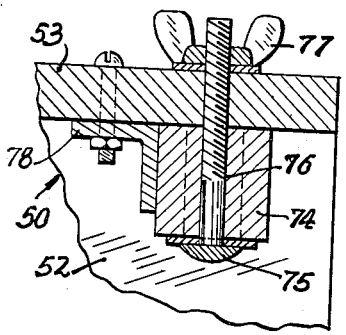
Fig. 6 is a partial enlarged horizontal sectional view on the line 6—6 of Fig. 3.
Figure 7:
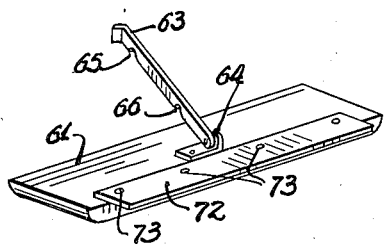
Fig. 7 is a perspective view of one of the flaps per se.
Figure 8:
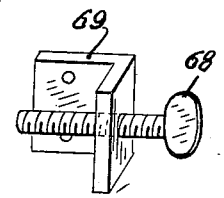
Fig. 8 is a perspective view of one of the leaf holding numbers per se.

The traveling basket, according to this invention, includes a box-like container 50 having a top wall 51, a bottom wall 52 and end walls 53. The container 50 has its front and back open. Leaves 54 are pivotally mounted by means of hinges 55 upon the front and back edges of the top wall of the container. When the leaves 54 are depended downwards they close the top portion of the open front and back of the container. The interior of the container is sub-divided into a plurality of separate compartments by means of vertical walls 80.

A pair of inverted U-shaped handles 56 are mounted upon the end walls 53 of the container 50 and extend over the top wall 51 providing a convenient means by which the container may be carried about. The free ends of the arms of the U-shaped handles 56 are pivotally attached to the side walls 53 by pivot pins 57.

Figure 4:
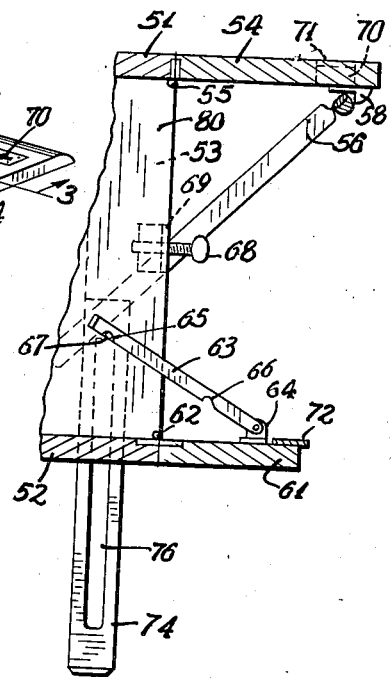
Fig. 4 is a view similar to a portion of Fig. 3 with the flap holding means added.

The handles 56 are arranged to be swung outwards to a horizontal position, then the leaves 54 may be raised to a horizontal position. The handles 56 may then be raised to extend obliquely from the sides of the container and be snapped beneath the angle members 58, as shown in Figs. 3 and 4, to hold the leaves 54 securely in their horizontal raised positions. The angle members 58 are securely attached to the bottom or inside faces of the leaves 54.

The inside faces of the side arms of the U-shaped handles 56 are provided with strips 59. These strips 59 are adapted to frictionally bear against the exposed faces of the horizontal strips 60 mounted upon the end walls 53 of the container 50 for holding the handles 56 in their position shown in Figs. 1 and 5.

Flaps 61 are pivotally mounted upon the front and back edges of the bottom wall 52 by means of hinges 62. When the flaps 61 are extended vertically upwards as shown in Figs. 1 and 5 they close the bottom portions of the open front and back of the container 50. However, it is possible to pivot the flaps 61 downwards to a horizontal position extended from the edges of the bottom wall 52 as shown in Fig. 3 in which the flaps form shelves upon which articles are adapted to be rested.

Means is provided for holding the flaps 61 in either of their extreme positions. This means comprises levers 63 having one of their edges pivotally attached to brackets 64 mounted on the inner face of the flaps 61. The bottom edge of the levers 63 are formed with spaced cutouts 65 and 66 which are adapted to be engaged with pins 67 extending from one of the vertical partition walls 80 of the container 50. When the cutouts 65 are engaging the pins 67 as shown in Fig. 4 the flaps 61 will be in their horizontal extended position. On the other hand when the cutouts 66 engage the pins 67 the flaps will be in their upwardly directed positions.

Screw members 68 threadedly engage complementary brackets 69 mounted on the inside face of the end walls 53 of the container 50. The screw members 68 have flat heads which are adapted to be passed through complementary elongated openings 70 formed in the leaves 54. After being passed through the openings 70 the heads are adapted to be at right angles to the length of the openings as shown in Fig. 1 for holding the leaves in their downwardly extended positions. The outer face of the leaves 54 surrounding the openings 70 is reinforced by having small metallic plates 71 set therein.

Figure 2:
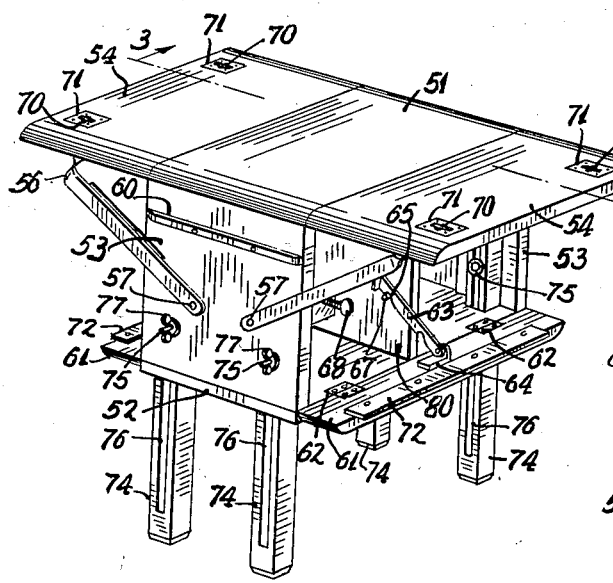
Fig. 2 is a perspective view similar to Fig. 1 but with the basket entirely opened.

Metallic strips 72 have one of their edges attached to the top edges of the flaps 61 by means of screws. The other edges of the strips 72 are projected beyond the top edges of the flaps 61 to engage behind the bottom edges of the leaves 54 as shown in Fig. 2, for locking the flaps in their upwardly directed positions when the leaves are locked in their downwardly directed positions.

Legs 74 are slidably passed through openings formed in the bottom wall 52 of the container 50. Bolts 75 pass through elongated slots 76 formed in the legs 74 and then through complementary openings formed in the end walls 53 of the container 50. The free outer ends of the bolts 75 are provided with thumb nuts 77 for locking the legs 74 in extended or retracted positions with relation to the bottom wall 52. When the legs are retracted as shown in Fig. 1 they are inoperative, but when extended as shown in Fig. 2 the container 50 will be supported at an elevation in which its top wall 51 will be approximately at table height.

Angle members 78 are mounted on the inside face of the end walls 53 of the container 50 and project along one side of the legs 74 to guide the vertical movement of the legs 74.

The operation of this device is as follows:

Normally the container 50 appears as shown in Fig. 1 with the legs in their retracted position within the container 50. The picnic articles are stored with the container and it may be conveniently carried about. When the picnic site is reached the container 50 is rested temporarily upon a seat or other objects while the legs 74 are lowered to the position shown in Fig. 2. Then the container is lifted slightly and the support is withdrawn from beneath the container permitting it to rest upon its own legs. The handles 17 are pivoted to a horizontal position. The screw members 68 are then turned to align their heads with the openings 71 freeing the leaves 54 to be raised to the horizontal position. The handles 17 are then lifted to engage beneath the leaves and snapped into the angle members 58 locking handles 17 to the bottom faces of the leaves 14. The cutouts 66 of the levers 65 are then disengaged from the pins 67 and the flaps 27 are then lowered to form shelves with the cutouts 65 of the levers being engaged with the pins 67 to support the flaps. The container 10 will then appear as shown in Fig. 2 ready to be used as a table. To return the container to its starting position the above procedure is reversed.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A traveling basket, comprising a box-like container having a flat top wall, a bottom wall and end walls and being open at the front and back, leaves hingedly mounted on the front and back edges of said top wall and when depending, closing said open front and back of said container, a pair of inverted U-shaped handles pivotally mounted upon said end walls and extending over said top wall and adapted to be pivoted obliquely outwards and be engaged beneath said leaves when the latter are raised to horizontal positions, means for releasibly connecting said handles and leaves in their latter described positions, extendable legs for supporting said container, and means for holding said legs in their extended positions.

2. A traveling basket, comprising a box-like container having a flat top wall, a bottom wall and end walls and being open at the front and back, leaves hingedly mounted on the front and back edges of said top wall and when depending, closing said open front and back of said container, a pair of inverted U-shaped handles pivotally mounted upon said end walls and extending over said top wall and adapted to be pivoted obliquely outwards and be engaged beneath said leaves when the latter are raised to horizontal positions, means for releasibly connecting said handles and leaves in their latter described positions, extendable legs for supporting said container, and means for holding said legs in their extended positions, and frictional means holding said handles in their inoperative positions extended across the top face of the top wall of said container.

3. A traveling basket, comprising a box-like container having a flat top wall, a bottom wall and end walls and being open at the front and back, leaves hingedly mounted on the front and back edges of said top wall and when depending, closing said open front and back of said container, a pair of inverted U-shaped handles pivotally mounted upon said end walls and extending over said top wall and adapted to be pivoted obliquely outwards and be engaged beneath said leaves when the latter are raised to horizontal positions, means for releasibly connecting said handles and leaves in their latter described positions, extendable legs for supporting said container, and means for holding said legs in their extended positions, said first means comprising angle members mounted on the bottom face of said leaves and beneath which said handles are adapted to be snapped.

ANTONIO P. PEREZ.